(12) United States Patent
Luo et al.

(10) Patent No.: US 11,782,628 B2
(45) Date of Patent: Oct. 10, 2023

(54) MIGRATION OF VIRTUALIZED COMPUTING INSTANCE WITH MULTIPLE DISK CHAINS IN VIRTUALIZED COMPUTING ENVIRONMENT

(71) Applicant: VMware, Inc., Palo Alto, CA (US)

(72) Inventors: Banghui Luo, Shanghai (CN); Tao Xie, Shanghai (CN); Zhen Liu, Shanghai (CN); Enning Xiang, San Jose, CA (US); YangYang Zhang, Shanghai (CN); Wenguang Wang, Santa Clara, CA (US); Kiran Patil, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/684,436

(22) Filed: Mar. 2, 2022

(65) Prior Publication Data

US 2023/0221877 A1 Jul. 13, 2023

(30) Foreign Application Priority Data

Jan. 10, 2022 (WO) ................ PCT/CN2022/071067

(51) Int. Cl.
*G06F 3/06* (2006.01)

(52) U.S. Cl.
CPC ............ *G06F 3/0647* (2013.01); *G06F 3/067* (2013.01); *G06F 3/0617* (2013.01); *G06F 3/0619* (2013.01); *G06F 3/0659* (2013.01); *G06F 3/0664* (2013.01)

(58) Field of Classification Search
CPC .... G06F 3/0647; G06F 3/0617; G06F 3/0619; G06F 3/0659; G06F 3/0664; G06F 3/067
See application file for complete search history.

(56) References Cited

U.S. PATENT DOCUMENTS

| 2020/0192594 A1* | 6/2020 | Balachandran ....... G06F 3/0647 |
| 2022/0188042 A1* | 6/2022 | Tatiparthi .............. G06F 3/0683 |

* cited by examiner

*Primary Examiner* — Eric Cardwell
(74) *Attorney, Agent, or Firm* — SU IP CONSULTING

(57) ABSTRACT

Example methods and systems to perform a migration of a virtualized computing instance and its first snapshot hierarchy from a first object store to a second object store have been disclosed. One example method includes identifying a first disk chain of the first snapshot hierarchy having an object running point, identifying a second disk chain of the first snapshot hierarchy different from the first disk chain, and migrating the second disk chain from the first object store to the second object store to form a first branch of a second snapshot hierarchy in the second object store. After the migrating, the example method includes instructing to take a first native snapshot on the object running point in the second object store, instructing to revert the object running point along the first branch and migrating the first disk chain from the first object store to the second object store.

21 Claims, 6 Drawing Sheets

MIGRATION OF VIRTUALIZED COMPUTING INSTANCE WITH MULTIPLE DISK CHAINS IN VIRTUALIZED COMPUTING ENVIRONMENT

CROSS-REFERENCE TO RELATED APPLICATION

The present application claims the benefit of Patent Cooperation Treaty (PCT) Application No. PCT/CN2022/071067, filed Jan. 10, 2022, which is incorporated herein by reference.

BACKGROUND

Unless otherwise indicated herein, the approaches described in this section are not admitted to be prior art by inclusion in this section.

Virtualization allows the abstraction and pooling of hardware resources to support virtual machines (VMs) in a virtualized computing environment. For example, through server virtualization, virtualized computing instances such as VMs running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc.

In a distributed system, storage resources of a cluster of hosts may be aggregated to form a single shared pool of storage including one or more datastores/object stores. VMs supported by the hosts within the cluster may then access the pool to store data. The data is stored and managed in a form of a data container called an object or a storage object. An object is a logical volume that has its data and metadata distributed in the distributed storage system.

Snapshotting is a storage feature that allows for a creation of a snapshot, which is a point-in-time read-only copy of an object. Each snapshot of a VM may preserve the state and data of the VM at a specific point-in-time. The state may include the VM's power state (e.g., powered-on, powered-off, suspended). The data may include files that make up the VM, including disks, memory, and other devices, such as virtual network interface cards. A VM can be snapshotted at different points-in-time.

Migrations of a VM in the distributed system is common, which also includes moving the snapshots of the VM from a first datastore to a second datastore. However, when different datastores have different mechanisms to support snapshots, migrating a VM and its snapshots between these different datastores can be challenging.

DETAILED DESCRIPTION

Figure 1:
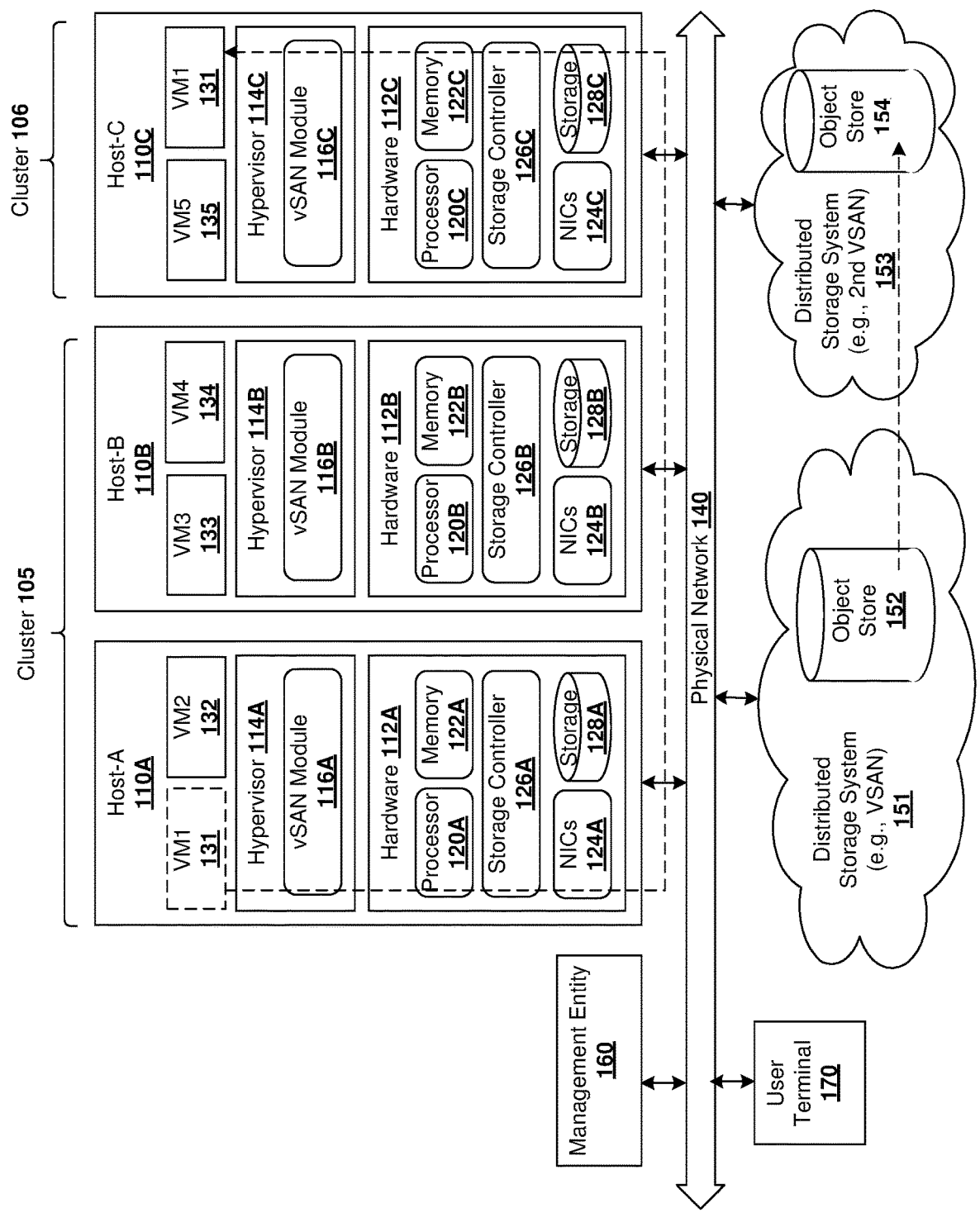
FIG. 1 is a schematic diagram illustrating an example virtualized computing environment in which one or more virtualized computing instances and corresponding snapshots are migrated from a first object store to a second object store.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. In other embodiments, a first element may be referred to as a second element, and vice versa.

In this disclosure, a "You Are Here" disk refers to a vmdk file on a snapshot hierarchy that accepts one or more new write operations. An "object running point" refers to an object represented by an object URL that accepts one or more new write operations. In an object store that supports redo log snapshots, the "You Are Here" disk may correspond to the "object running point." A ".vmdk" file is a descriptor file that describes a container for a virtual hard disk drive to be used in a virtual machine.

Challenges relating to migrations of a virtualized computing instance and its snapshot hierarchy between different object stores in a virtualized computing environment will now be explained in more detail using FIG. 1, which is a schematic diagram illustrating example virtualized computing environment 100. It should be understood that, depending on the desired implementation, virtualized computing environment 100 may include additional and/or alternative components than that shown in FIG. 1.

In the example in FIG. 1, virtualized computing environment 100 includes clusters 105/106. Each cluster 105/106 may include one or more hosts. For example, cluster 105 includes host-A 110A and host-B 110B and cluster 106 includes host-C 110C. In the following, reference numerals with a suffix "A" relates to host-A 110A, suffix "B" relates to host-B 110B, and suffix "C" relates to host-C 110C. Although three hosts (also known as "host computers", "physical servers", "server systems", "host computing systems", etc.) are shown for simplicity, clusters 105/106 may include any number of hosts. Although two clusters 105/106 are shown for simplicity, virtualized computing environment 100 may include any number of clusters.

Each host 110A/110B in cluster 105 and each host (e.g., host 110C) in cluster 106 include suitable hardware 112A/112B/112C and execute virtualization software such as hypervisor 114A/114B/114C to maintain a mapping between physical resources and virtual resources assigned to various virtual machines. For example, Host-A 110A supports VM2 132; host-B 110B supports VM3 133 and VM4 134; and host-C 110C supports VM1 131 and VM5 135. In practice, each host 110A/110B/110C may support any number of virtual machines, with each virtual machine executing a guest operating system (OS) and applications. Hypervisor 114A/114B/114C may also be a "type 2" or hosted hypervisor that runs on top of a conventional operating system (not shown) on host 110A/110B/110C.

Although examples of the present disclosure refer to "virtual machines," it should be understood that a "virtual machine" running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Hardware 112A/112B/112C includes any suitable components, such as processor 120A/120B/120C (e.g., central processing unit (CPU)); memory 122A/122B/122C (e.g., random access memory); network interface controllers (NICs) 124A/124B/124C to provide network connection; storage controller 126A/126B/126C that provides access to storage resources 128A/128B/128C, etc. Corresponding to hardware 112A/112B/112C, virtual resources assigned to each virtual machine may include virtual CPU, virtual memory, virtual machine disk(s), virtual NIC(s), etc.

Storage controller 126A/126B/126C may be any suitable controller, such as redundant array of independent disks (RAID) controller, etc. Storage resource 128A/128B/128C may represent one or more disk groups. In practice, each disk group represents a management construct that combines one or more physical disks, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, Integrated Drive Electronics (IDE) disks, Universal Serial Bus (USB) storage, etc.

Through storage virtualization, hosts 110A and 110B in cluster 105 aggregate their storage resources 128A and 128B to form distributed storage system 151, which represents a shared pool of storage resources. For example, in FIG. 1, host-A 110A and host-B 110B aggregate respective local physical storage resources 128A and 128B into an object store (datastore) 152. Data (e.g., virtual machine data) stored in object store 152 may be placed on, and accessed from, one or more of storage resources 128A and 128B.

Similarly, hosts (e.g., host-C 110C and other hosts, not shown for simplicity) in cluster 106 also aggregate their storage resources (e.g., 128C and storage resources of other hosts in cluster 106) to form distributed storage system 153, which represents another shared pool of storage resources and forms another object store (datastore) 154. Data (e.g., virtual machine data) stored in object store 154 may be placed on, and accessed from, one or more of storage resource 128C and storage resources of other hosts in cluster 106. In practice, distributed storage systems 151/153 may employ any suitable technology, such as Virtual Storage Area Network (vSAN) from VMware, Inc.

In virtualized computing environment 100, management entity 160 provides management functionalities to various managed objects, such as clusters 105/106, hosts 110A-110C, virtual machines 131-136, etc. Management entity 160 may manage a migration of a VM in virtualized computing environment in response to receiving a migration request from user terminal 170.

For example, VM1 131 on host-C 110C was previously supported by host-A 110A and is migrated from host-A 110A of cluster 105 to host-C 110C of cluster 106. Assuming VM1 131 has been snapshotted and the snapshot(s) are stored in object store 152, the snapshot(s) will also be migrated from object store 152 to object store 154.

Object store 152 may support a first snapshot implementation and object store 154 may support a second snapshot implementation. The first snapshot implementation may be the redo log snapshot implementation and the second snapshot implementation may be the native snapshot implementation.

In the redo log snapshot implementation, when a snapshot of a VM is taken for the first time, a first child disk will be created from a parent disk of the VM. New write operations will be directed to the first child disk. Read operations associated with the new writes will be also directed to the first child disk but other read operations will be directed to the parent disk. A successive snapshot will generate a successive child disk from the last child disk. Similarly, new write operations will be directed to the successive child disk. Read operations associated with the new writes will be directed to the successive child disk but other read operations will be directed to the parent disk or the first child disk. The parent disk, the first child disk and successive child disk(s) may form a disk chain so that the VM can revert to any snapshot on the disk chain corresponding to the parent disk, the first child disk or any of the successive child disks. In the redo log snapshot implementation, any of the parent disk and the child disks is stored as an independent object in an object store (e.g., object store 152).

Figure 2:
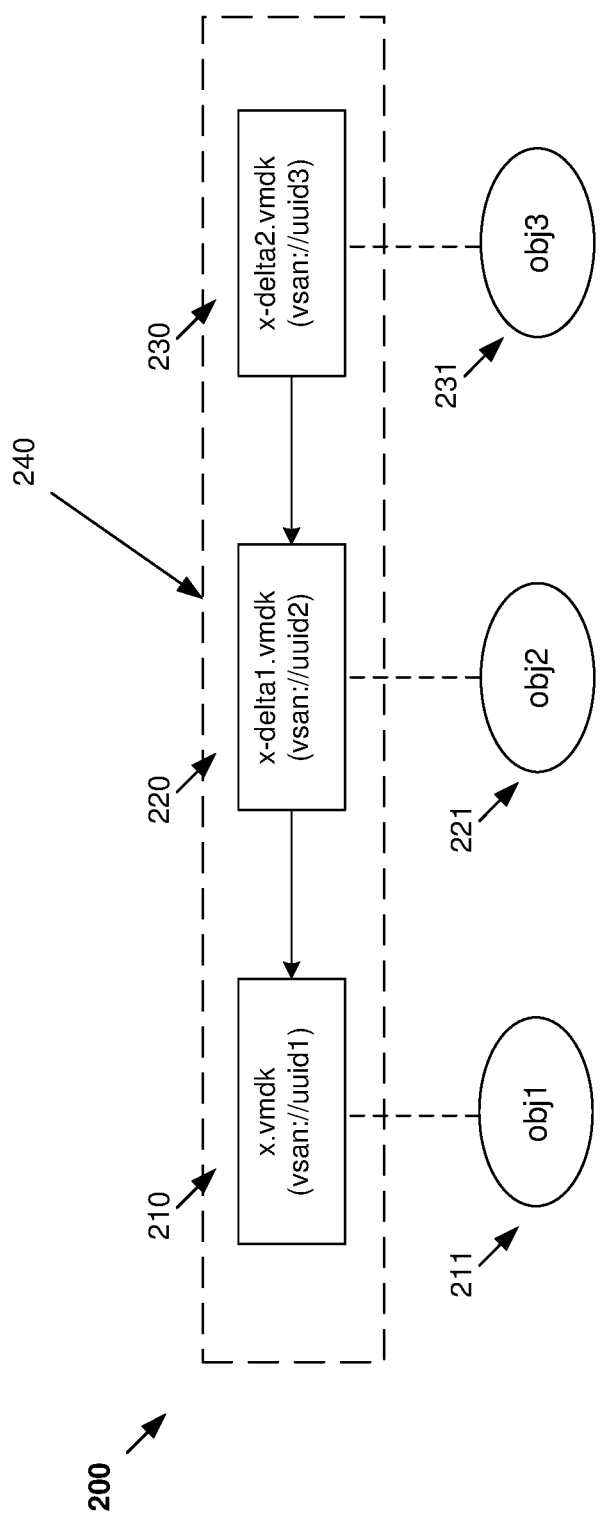
FIG. 2 illustrates a branch of a redo log snapshot hierarchy in a first object store.

FIG. 2 illustrates a branch 200 of a redo log snapshot hierarchy in a first object store. In some embodiments, in conjunction with FIG. 1, the first object store may correspond to object store 152. Branch 200 includes, but not limited to, first set of data 210, second set of data 220 and third set of data 230, each corresponding to state and data of a VM at a first, a second and a third specific point-in-time, respectively. First, second and third set of data 210, 220 and 230 are stored in files of x.vmdk, x-delta1.vmdk and x.delta2.vmdk, respectively. In some embodiments, x.vmdk, x-delta1.vmdk and x.delta2.vmdk may correspond to objects 211, 221 and 231 in the first object store, respectively. In some embodiments, objects 211, 221 and 231 may be identified in the first object store according to object Uniform Resource Locator (URL) of vsan://uuid1, vsan://uuid2 and vsan://uuid3, respectively.

In some embodiments, x.vmdk, x-delta1.vmdk and x.delta2.vmdk may correspond to the parent disk, the first child disk and the successive child disk described above, respectively. Parent to child relationships among x.vmdk, x-delta1.vmdk and x.delta2.vmdk define a disk chain 240 of parent disk to child disk(s).

In the native snapshot implementation, different snapshots of a VM at different point-in-time are stored in a single object with different snapshot identifiers. For example, when a snapshot of the VM is taken at a first specific point-in-time, the state and data of the VM at the first specific point-in-time are stored in the single object with a first snapshot identifier in an object store (e.g., object store 154 in FIG. 1). New write operations will be directed to the running point of the single object. Read operations associated with the new writes will be also directed to the running point of the single object but other read operations will be directed to the part of the single object identified with the first snapshot identifier. When a successive snapshot of the VM is taken on the running point at a second specific point-in-time, the state and data of the VM at the second specific point-in-time are stored in the single object with a second snapshot identifier in object store 154. Now, new write operations will be directed to the running point of the single object. Read operations associated with the new writes will be directed to the running point but other read operations will be directed to the part of the single object identified with the first snapshot identifier and/or the second snapshot identifier. However, a constraint of an object store which supports the native snapshot implementation is that a snapshot can only be taken on the running point and cannot be taken on another snapshot.

Figure 3:
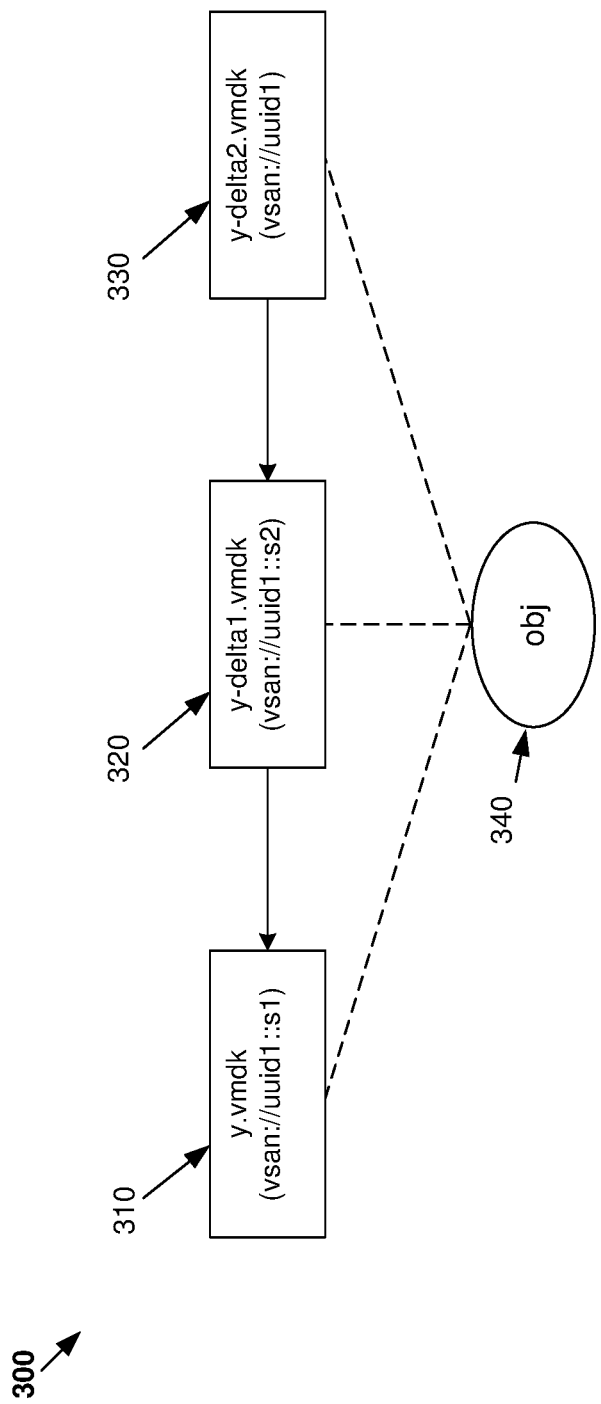
FIG. 3 illustrates a branch of a native snapshot hierarchy in a second object store.

FIG. 3 illustrates a branch 300 of a native snapshot hierarchy in a second object store. In conjunction with FIG. 1, the second object store may be object store 154. In some embodiments, branch 300 includes, but not limited to, first set of data 310, second set of data 320 and third set of data 330, each corresponding to state and data of a VM at a first, a second and a third specific point-in-time, respectively. First, second and third set of data 310, 320 and 330 are stored as one single object 340 in object store 154. However, first set of data 310 may correspond to data of a base vmdk file (e.g., y.vmdk), second set of data may correspond to data of a first delta file (e.g., y-delta1.vmdk file) and third set of data may correspond to data of a second delta file (e.g., y-delta2.vmdk file). In some embodiments, the base vmdk file may be identified based on an object URL of object 340 and a first snapshot identifier (i.e., vsan://uuid1::s1) and cannot accept new writes. The first delta file may be identified based on the object URL of object 340 and a second snapshot identifier (i.e., vsan://uuid1::s2) and cannot accept new writes. The second delta file may be identified based on the object URL of object 340 only (i.e., vsan://uuid1) because the second delta file corresponds to the running point of object 340.

Figure 4:
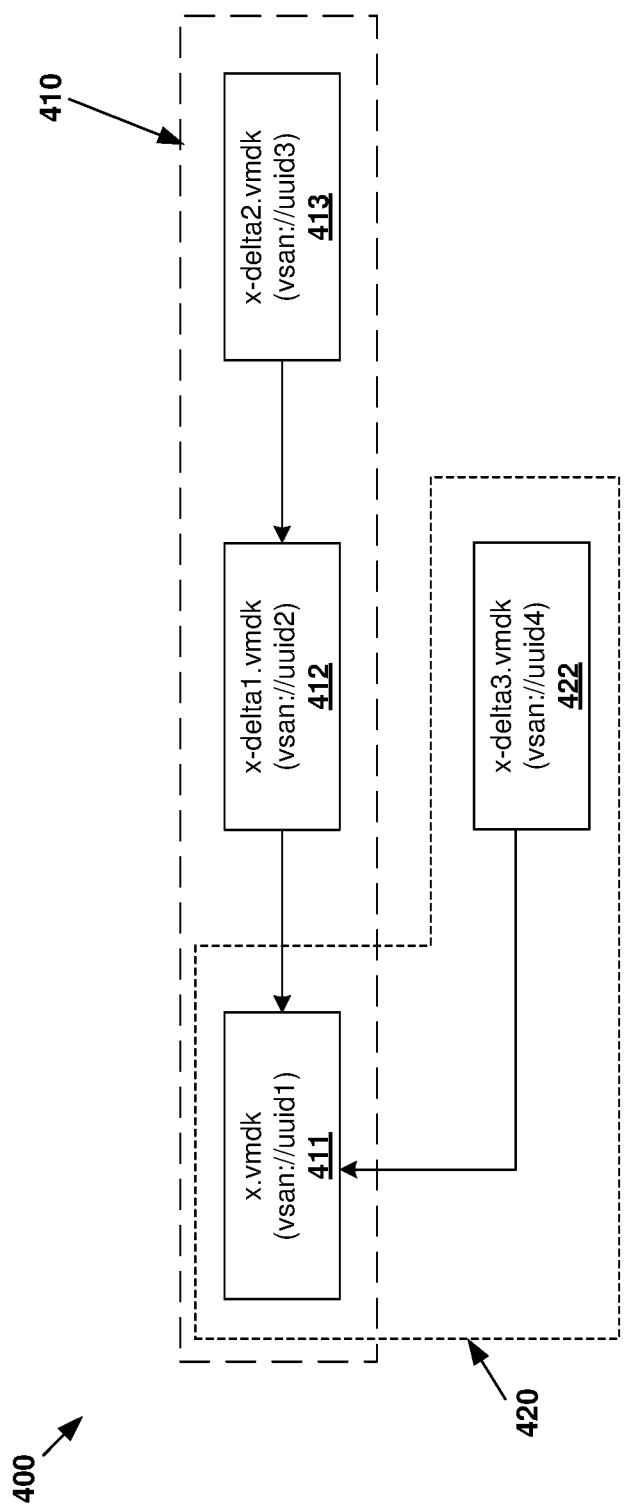
FIG. 4 illustrates a snapshot hierarchy of a VM including a plurality of branches in a first object store.

Challenges of migrating a VM with its snapshot hierarchy from a first object store configured to support redo log snapshots to a second object store configured to support native snapshots are further described below. FIG. 4 illustrates snapshot hierarchy 400 of a VM including branches 410 and 420 in the first object store. Branches 410 and 420 may be first and second disk chains 410 and 420 in the first object store, respectively. First disk chain 410 includes a parent disk 411, a first child disk 412 and a second child disk 413. Second disk chain 420 includes the parent disk 411 and a third child disk 422. Third child disk 422 is the "You Are Here" disk and the object running point. Disk chain 410 is formed by taking a first snapshot on parent disk 411 to form first child disk 412 and a second snapshot on first child disk 412 to form second child disk 413. Disk chain 420 is formed by reverting from second child disk 413 back to parent disk 411 and taking a third snapshot on parent disk 411 to form third child disk 422.

In some embodiments, data on parent disk 411 may be saved in a file of x.vmdk and stored in an object represented by object URL of vsan://uuid1 in the first object store. Similarly, data on first child disk 412 may be saved in a file of x-delta1.vmdk and stored in an object represented by object URL of vsan://uuid2 in the first object store, data on second child disk 413 may be saved in a file of x-delta2.vmdk and stored in an object represented by object URL of vsan://uuid3 in the first object store, and data on third child disk 422 may be saved in a file of x-delta3.vmdk and stored in an object represented by an object URL of vsan://uuid4 in the first object store.

Conventionally, in response to a migration of the VM and its snapshot hierarchy from the first object store to the second object store, in conjunction with FIG. 1, management entity 160 is configured to perform chain copy operations to copy disk chains 410 and 420 from the first object store to the second object store.

The chain copy operation may include a first chain copy operation configured to copy disk chain 420 and a second chain copy operation configured to copy disk chain 410 from the first object store to the second object store. In conjunction with FIG. 5, the first chain copy operation includes copying chain 420 from the first object store to form chain 520 in the second object store. The second chain copy operation includes copying chain 410 from the first object store to form chain 510 in the second object store.

The first chain copy operation may include a first step of creating y.vmdk 511 in the second object store and copying data of x.vmdk 411 to y.vmdk 511. Y.vmdk 511 may correspond to an object represented by an object URL of vsan://uuid1 in the second object store and is the object running point now.

The first chain copy operation may include a second step of creating a native snapshot on y.vmdk 511 because the second object store is configured to support native snapshots. Therefore, y.vmdk 511 now becomes a snapshot. The snapshot on y.vmdk 511 returns a first snapshot identifier of "::s1". The snapshot on y.vmdk 511 may be represented by the object URL and the first snapshot identifier of vsan://uuid1::s1. After the snapshot, a new y-delta3.vmdk 522 is created and the y-delta3.vmdk 522 now becomes the object running point which is represented by the object URL of vsan://uuid1. A single chain copy operation (e.g., the first chain operation) works fine in conventional approaches. However, at least two problems when more than one chain copy operation is involved.

When performing the second chain copy operation configured to copy disk chain 410 from the first object store to the second object store, it is supposed to take a snapshot on y.vmdk 511 and try to create y-delta1.vmdk 512. However, as previously discussed, y.vmdk 511 is now a snapshot and the second object store cannot take a snapshot on a snapshot. Therefore, the second chain copy operation will fail.

Another problem is associated with the state of the object running point. Even assuming we could create a native snapshot on y.vmdk 511 (even y.vmdk 511 is a snapshot) and creating y-delta1.vmdk 512 and y-delta2.vmdk 513 from y.vmdk 511, this operation would end up turning y-delta2.vmdk 513 as the object running point. However, y-delta2.vmdk 513 actually corresponds to x-delta2.vmdk 413 which is not the running point of the VM in the first object store and cannot accept new writes. Therefore, new write operations in the second object store will also fail.

Figure 5:
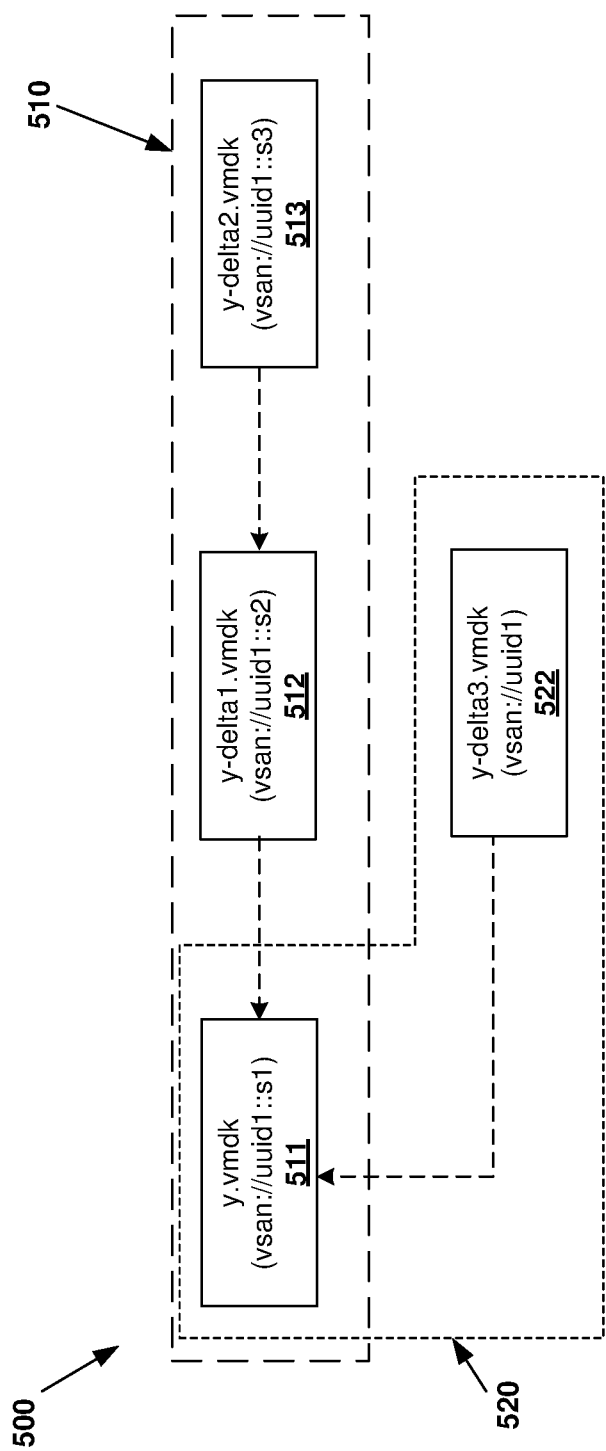
FIG. 5 illustrates a snapshot hierarchy of a VM including a plurality of branches in a second object store.

FIG. 5 illustrates snapshot hierarchy 500 of a VM in a second object store. In some embodiments, snapshot hierarchy 500 includes multiple branches, such as branches 510 and 520. Snapshots in each branch of snapshot hierarchy 500 has parent to child relationships. In some embodiments, the second object store is configured to support native snapshots. In conjunction with FIG. 4, snapshot hierarchy 400 is migrated from a first object store configured to support redo log snapshots to the second object store and forms snapshot hierarchy 500.

Figure 6:
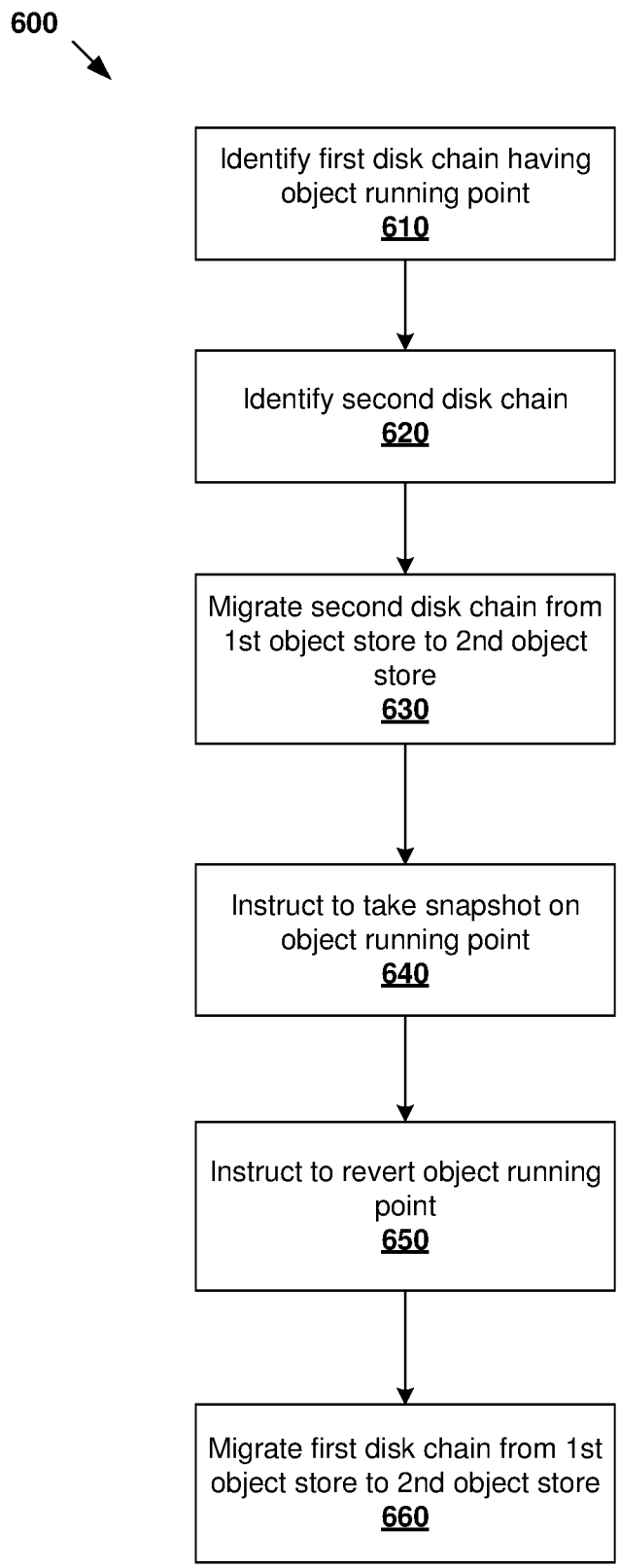
FIG. 6 is a flow diagram of an example process to migrate a VM and its snapshot hierarchy having a plurality of branches from a first object store to a second object store, all arranged according to one or more embodiments of the present disclosure.

FIG. 6 is a flow diagram of an example process 600 to migrate a VM and its snapshot hierarchy having a plurality of branches from a first object store to a second object store, according to one or more embodiments of the present disclosure. Example process 600 may include one or more operations, functions, or actions illustrated by one or more blocks, such as 610 to 660. The various blocks may be combined into fewer blocks, divided into additional blocks, and/or eliminated depending on the desired implementation. In some embodiments, process 600 may be performed by management entity 160 illustrated in FIG. 1.

Process 600 may start with block 610 "identify first disk chain having object running point." In some embodiments, in conjunction with FIG. 1 and FIG. 4, in response to migrating VM1 131 from host-A 110A to host-C 110C, management entity 160 is configured to identify the disk chain including the "You Are Here" disk in snapshot hierarchy 400, which is disk chain 420. In some embodiments, the first object store which supports redo log snapshots, the "You Are Here" disk is also the object running point. Management entity 160 is configured to migrate this identified disk chain (e.g., first disk chain) later than any other branches in snapshot hierarchy 400. Block 610 may be followed by block 620.

In some embodiments, in block 620 "identify second disk chain," in conjunction with FIG. 1 and FIG. 4, management entity 160 is configured to identify a disk chain different from the disk chain identified in block 610. In some embodiments, the disk chain identified in block 620 (e.g., disk chain 410) does not include the "You Are Here" disk in snapshot hierarchy 400. The disk chain identified in block 620 may correspond to any branch, except the branch associated with the "You Are Here" disk, in snapshot hierarchy 400. Block 620 may be followed by block 630.

In some embodiments, in block 630 "migrate second disk chain from 1st object store to 2nd object store," in conjunction with FIG. 1 and FIG. 4, management entity 160 is configured to migrate disk chain 410 (e.g., second disk chain) prior to migrate disk chain 420. In migration of disk chain 410 from the first object store to the second object store, management entity 160 is configured to instruct destination host-C 110C to perform a first chain copy operation to copy disk chain 420 from the first object store to the second object store.

In some embodiments, in conjunction with FIG. 5, the first chain copy operation includes a first step of creating y.vmdk 511 in the second object store and copying data of x.vmdk to y.vmdk 511. Y.vmdk 511 corresponds to an object represented by object URL of vsan://uuid1 in the second object store.

In some embodiments, the first chain copy operation includes a second step of creating a first native snapshot on y.vmdk 511. Therefore, y.vmdk 511 becomes a snapshot. The first snapshot on y.vmdk 511 returns a first snapshot identifier of "::s1". The snapshot on y.vmdk 511 may be represented by the object URL and the first snapshot identifier of vsan://uuid1::s1. After the first native snapshot, a new y-delta1.vmdk 512 is created and the y-delta1.vmdk 512 now becomes the object running point which is represented by the object URL of vsan://uuid1. The second step also includes copying data of x-delta1.vmdk 412 to y-delta1.vmdk 512.

The first chain copy operation may include a third step of creating a second native snapshot on y-delta1.vmdk 512. The second snapshot on y-delta1.vmdk 512 returns a second snapshot identifier of "::s2". Similarly, this new snapshot may be represented by vsan://uuid1::s2. After the second native snapshot, y-delta2.vmdk 513 is created and the y-delta2.vmdk 513 now becomes the object running point which is represented by the object URL of vsan://uuid1. The third step also includes copying data of x-delta2.vmdk 413 to y-delta2.vmdk 513. Block 630 may be followed by block 640.

In some embodiments, after the first chain copy operation for disk chain 410 and before starting a second chain copy operation for disk chain 420, in block 640 "instruct to take snapshot on object running point," management entity 160 is configured to instruct host-C 110C to take a snapshot on the object running point of y-delta2.vmdk 513, update a descriptor file of this created snapshot so that y-delta2.vmdk 513 becomes a snapshot and represented by the object URL (i.e., vsan://uuid1) and a third snapshot identifier (e.g., ::s3) of vsan://uuid1::s3 in the second object store. Block 640 may be followed by block 650.

In some embodiments, in block 650 "instruct to revert object running point," management entity 160 is configured to instruct host-C 110C to revert the object running point from y-delta2.vmdk 513 back to y.vmdk 511, which corresponds to x.vmdk 411 from which snapshot hierarchy 400 splits into branches 410 and 420. Now the object running point is y.vmdk 511. Block 650 may be followed by block 660.

In some embodiments, after the reverting, in block 660 "migrate first disk chain from 1st object store to 2nd object store", management entity 160 is configured to instruct host-C 110C to perform a second chain copy operation for disk chain 420. The second chain copy operation may include a step of creating a native snapshot on the object running point of y.vmdk 511 and turns y.vmdk 511 as a snapshot pointed by vsan://uuid1::s1 in the second object store. A new y-delta3.vmdk 522 is created after the snapshot and the y-delta3.vmdk 522 now becomes the object running point pointed by the object URL of vsan://uuid1 in the second object store. Accordingly, after the operations discussed above, snapshot hierarchy 400 is successfully migrated from the first object store to the second object store and forms snapshot hierarchy 500 in the second object store.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non-recordable media (e.g., read-only memory (ROM), random access memory (RAM), magnetic disk or optical storage media, flash memory devices, solid-state drive, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a management entity to perform a migration of a virtualized computing instance and a first snapshot hierarchy associated with the virtualized computing instance from a first object store to a second object store in a virtualized computing environment, comprising:
    identifying a first disk chain of the first snapshot hierarchy, wherein the first disk chain corresponds to a first branch of the first snapshot hierarchy and includes a first disk corresponding to an object running point associated with the virtualized computing instance;
    identifying a second disk chain of the first snapshot hierarchy, wherein the second disk chain is different from the first disk chain and corresponds to a second branch of the first snapshot hierarchy;
    migrating the second disk chain of the first snapshot hierarchy from the first object store to the second object store to form a first branch of a second snapshot hierarchy in the second object store;
    after migrating the second disk chain from the first object store to the second object store:
    instructing to take a first native snapshot on the object running point associated with the virtualized computing instance in the second object store;
    instructing to revert the object running point along the first branch of the second snapshot hierarchy; and
    migrating the first disk chain from the first object store to the second object store to form a second branch of the second snapshot hierarchy in the second object store.

2. The method of claim 1, wherein the first object store supports one or more redo log snapshots and the second object store supports one or more native snapshots.

3. The method of claim 1, wherein instructing to take the first native snapshot on the object running point associated with the virtualized computing instance in the second object store further includes instructing to update a descriptor file of the first native snapshot.

4. The method of claim 1, wherein instructing to revert the object running point includes instructing to revert the object running point back to a second native snapshot on the first branch of the second snapshot hierarchy, wherein the second native snapshot corresponds to a second disk on the second disk chain of the first snapshot hierarchy.

5. The method of claim 4, wherein the second disk corresponds to a disk at which the first snapshot hierarchy branches to form the first branch and the second branch.

6. The method of claim 4, wherein the migrating the first disk chain from the first object store to the second object store further includes taking a third native snapshot on the reverted object running point.

7. The method of claim 6, wherein the object running point is on the second branch including different sets of data corresponding to state and data of the virtualized computing instance at different points-in-time of the second snapshot hierarchy after migrating the first disk chain of the first snapshot hierarchy from the first object store to the second object store.

8. A non-transitory computer-readable storage medium that includes a set of instructions which, in response to execution by a processor of a computer system, cause the processor to perform a method of migrating a virtualized computing instance and a first snapshot hierarchy associated with the virtualized computing instance from a first object store to a second object store in a virtualized computing environment, the method comprising:
    identifying a first disk chain of the first snapshot hierarchy, wherein the first disk chain corresponds to a first branch of the first snapshot hierarchy and includes a first disk corresponding to an object running point associated with the virtualized computing instance;
    identifying a second disk chain of the first snapshot hierarchy, wherein the second disk chain is different from the first disk chain and corresponds to a second branch of the first snapshot hierarchy;
    migrating the second disk chain of the first snapshot hierarchy from the first object store to the second object store to form a first branch of a second snapshot hierarchy in the second object store;
    after migrating the second disk chain from the first object store to the second object store:
    instructing to take a first native snapshot on the object running point associated with the virtualized computing instance in the second object store;
    instructing to revert the object running point along the first branch of the second snapshot hierarchy; and
    migrating the first disk chain from the first object store to the second object store to form a second branch of the second snapshot hierarchy in the second object store.

9. The non-transitory computer-readable storage medium of claim 8, wherein the first object store supports one or more redo log snapshots and the second object store supports one or more native snapshots.

10. The non-transitory computer-readable storage medium of claim 8, including additional instructions which, in response to execution by the processor of the computer system, cause the processor to instruct to update a descriptor file of the first native snapshot.

11. The non-transitory computer-readable storage medium of claim 8, including additional instructions which, in response to execution by the processor of the computer system, cause the processor to instruct to revert the object running point back to a second native snapshot on the first branch of the second snapshot hierarchy, wherein the second native snapshot corresponds to a second disk on the second disk chain of the first snapshot hierarchy.

12. The non-transitory computer-readable storage medium of claim 11, wherein the second disk corresponds to a disk at which the first snapshot hierarchy branches to form the first branch and the second branch.

13. The non-transitory computer-readable storage medium of claim 11, wherein the migrating the first disk chain from the first object store to the second object store further includes taking a third native snapshot on the reverted object running point.

14. The non-transitory computer-readable storage medium of claim 13, wherein the object running point is on the second branch including different sets of data corresponding to state and data of the virtualized computing instance at different points-in-time of the second snapshot hierarchy after migrating the first disk chain of the first snapshot hierarchy from the first object store to the second object store.

15. A computer system configured to migrate a virtualized computing instance and a first snapshot hierarchy associated with the virtualized computing instance from a first object store to a second object store in a virtualized computing environment, comprising:
   a processor; and
   a non-transitory computer-readable medium having stored thereon instructions that, when executed by the processor, cause the processor to:
   identify a first disk chain of the first snapshot hierarchy, wherein the first disk chain corresponds to a first branch of the first snapshot hierarchy and includes a first disk corresponding to an object running point associated with the virtualized computing instance;
   identify a second disk chain of the first snapshot hierarchy, wherein the second disk chain is different from the first disk chain and corresponds to a second branch of the first snapshot hierarchy;
   migrate the second disk chain of the first snapshot hierarchy from the first object store to the second object store to form a first branch of a second snapshot hierarchy in the second object store;
   after migrating the second disk chain from the first object store to the second object store:
   instruct to take a first native snapshot on the object running point associated with the virtualized computing instance in the second object store;
   instruct to revert the object running point along the first branch of the second snapshot hierarchy; and
   migrate the first disk chain from the first object store to the second object store to form a second branch of the second snapshot hierarchy in the second object store.

16. The computer system of claim 15, wherein the first object store supports one or more redo log snapshots and the second object store supports one or more native snapshots.

17. The computer system of claim 15, wherein the non-transitory computer-readable medium has stored thereon additional instructions that, when executed by the processor, cause the processor to instruct to update a descriptor file of the first native snapshot.

18. The computer system of claim 15, wherein the non-transitory computer-readable medium has stored thereon additional instructions that, when executed by the processor, cause the processor to instruct to revert the object running point back to a second native snapshot on the first branch of the second snapshot hierarchy, wherein the second native snapshot corresponds to a second disk on the second disk chain of the first snapshot hierarchy.

19. The computer system of claim 18, wherein the second disk corresponds to a disk at which the first snapshot hierarchy branches to form the first branch and the second branch.

20. The computer system of claim 18, wherein the non-transitory computer-readable medium has stored thereon additional instructions that, when executed by the processor, cause the processor to take a third native snapshot on the reverted object running point.

21. The computer system of claim 20, wherein the object running point is on the second branch including different sets of data corresponding to state and data of the virtualized computing instance at different points-in-time of the second snapshot hierarchy after migrating the first disk chain of the first snapshot hierarchy from the first object store to the second object store.

* * * * *